US011392179B2

(12) United States Patent
Park et al.

(10) Patent No.: US 11,392,179 B2
(45) Date of Patent: Jul. 19, 2022

(54) IN-FOLDING TYPE HINGE STRUCTURE HAVING FLEXIBLE DISPLAY PANEL INSTALLED THEREIN

(71) Applicant: AUFLEX CO., LTD, Hwaseong-si (KR)

(72) Inventors: Hyun Min Park, Suwon-si (KR); Seoung Jun Lee, Uiwang-si (KR)

(73) Assignee: AUFLEX CO., LTD, Hwaseong-si (KR)

( * ) Notice: Subject to any disclaimer, the term of this patent is extended or adjusted under 35 U.S.C. 154(b) by 115 days.

(21) Appl. No.: 17/041,654

(22) PCT Filed: Mar. 27, 2019

(86) PCT No.: PCT/KR2019/003610
§ 371 (c)(1),
(2) Date: Sep. 25, 2020

(87) PCT Pub. No.: WO2019/190213
PCT Pub. Date: Oct. 3, 2019

(65) Prior Publication Data
US 2021/0026418 A1    Jan. 28, 2021

(30) Foreign Application Priority Data
Mar. 28, 2018    (KR) .......................... 10-2018-0036198

(51) Int. Cl.
*G06F 1/16* (2006.01)
*E05D 3/14* (2006.01)
*H04M 1/02* (2006.01)

(52) U.S. Cl.
CPC .............. *G06F 1/1681* (2013.01); *E05D 3/14* (2013.01); *E05Y 2900/606* (2013.01); *H04M 1/022* (2013.01)

(58) Field of Classification Search
CPC ..... G06F 1/1616; G06F 1/1681; G06F 1/1652
See application file for complete search history.

(56) References Cited

U.S. PATENT DOCUMENTS 7,055,215 B1 *  6/2006  Ligtenberg ............ G06F 1/1616
16/400
10,827,633 B2 *  11/2020  Yoo ........................ E05D 3/122
(Continued)

FOREIGN PATENT DOCUMENTS

JP         3193400         10/2014
KR    10-2014-0049911      4/2014
(Continued)

OTHER PUBLICATIONS

KIPO, A PCT Search Report & Written Opinion of PCT/KR2019/003610 dated Jul. 25, 2019.

*Primary Examiner* — Anthony Q Edwards
(74) *Attorney, Agent, or Firm* — Lex IP Meister, PLLC

(57) ABSTRACT

Provided is an in-folding type hinge structure having a flexible display panel installed therein in a mobile communication terminal in which a flexible display panel is provided in a pair of panel portions which are foldably connected to each other, in which rotation supports are provided in a pair of panel portions and a folding portion that connects the pair of panel portions such that the rotation supports are located between an inside close contact portion and an outside close contact portion which are fixed to the bottom surfaces of the panel portions, and the rotation supports are configured to perform a stable folding operation of the folding portion while the two panel portions are being folded or unfolded and to support the panel portions such that the two panel portions do not rotate over 180 degrees when the two panel portions are fully unfolded.

4 Claims, 9 Drawing Sheets

(56) References Cited

U.S. PATENT DOCUMENTS

| | | | | |
|---|---|---|---|---|
| 2016/0378203 | A1* | 12/2016 | Kim | ............ G06F 1/1679 |
| | | | | 345/156 |
| 2021/0274028 | A1* | 9/2021 | Park | ............ H04M 1/0222 |
| 2022/0075418 | A1* | 3/2022 | Song | ............ G06F 1/1681 |

FOREIGN PATENT DOCUMENTS

| | | |
|---|---|---|
| KR | 10-2015-0031602 | 3/2015 |
| KR | 10-2015-0099383 | 8/2015 |
| KR | 10-2015-0120742 | 10/2015 |
| KR | 10-2015-0142290 | 12/2015 |
| KR | 10-2016-0035681 | 4/2016 |

* cited by examiner

[FIG 1]
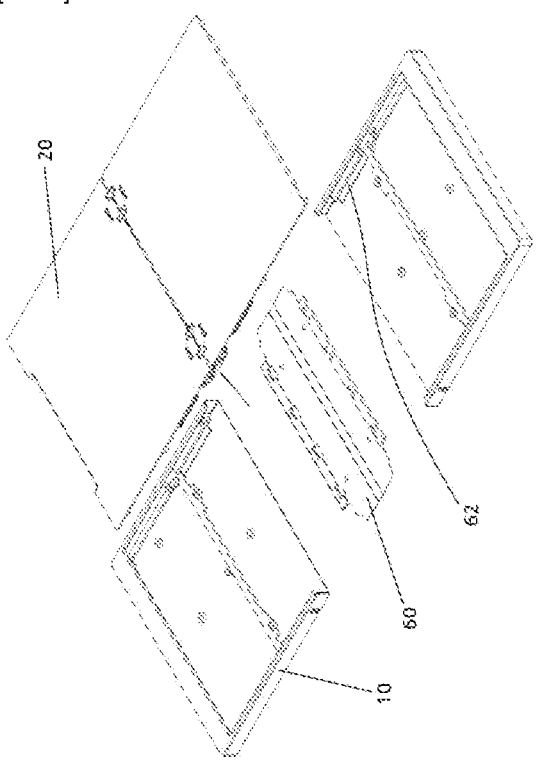
[FIG 2]
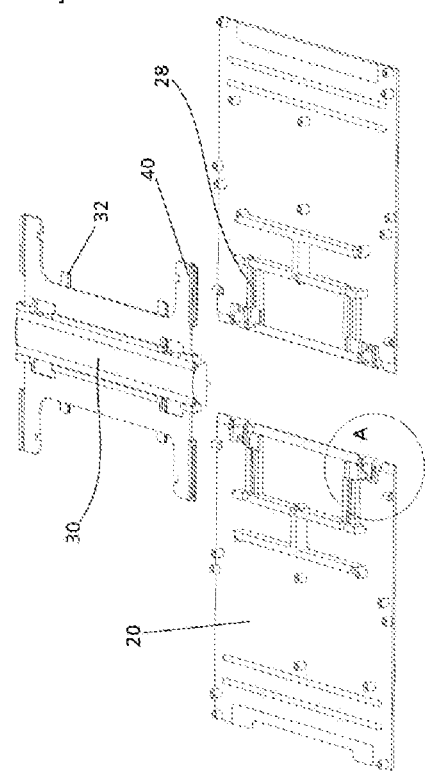

[FIG 3]
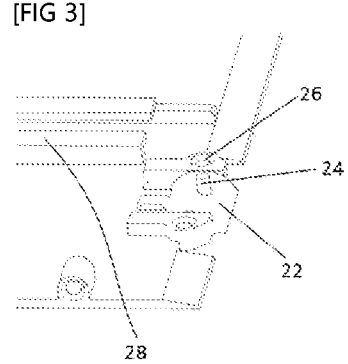
[FIG 4]
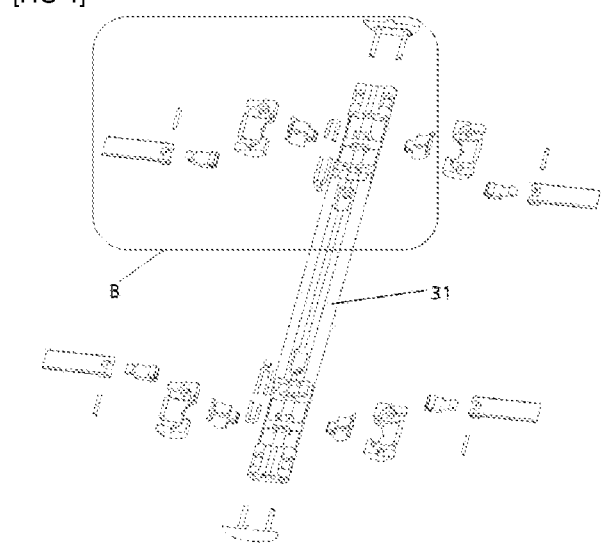

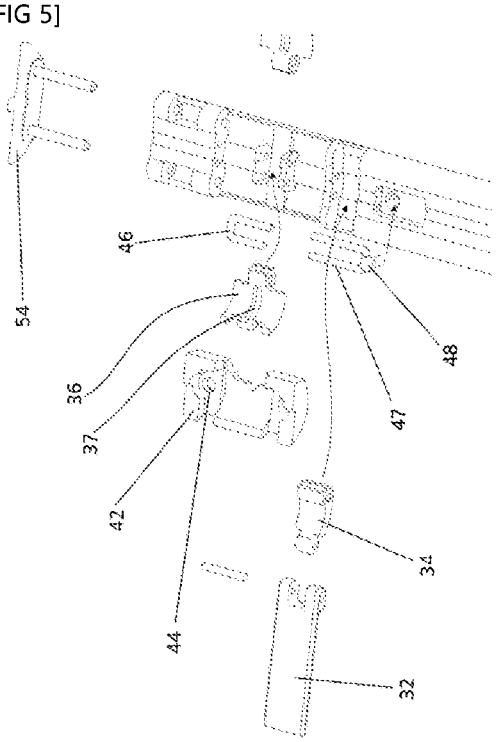

[FIG 6]
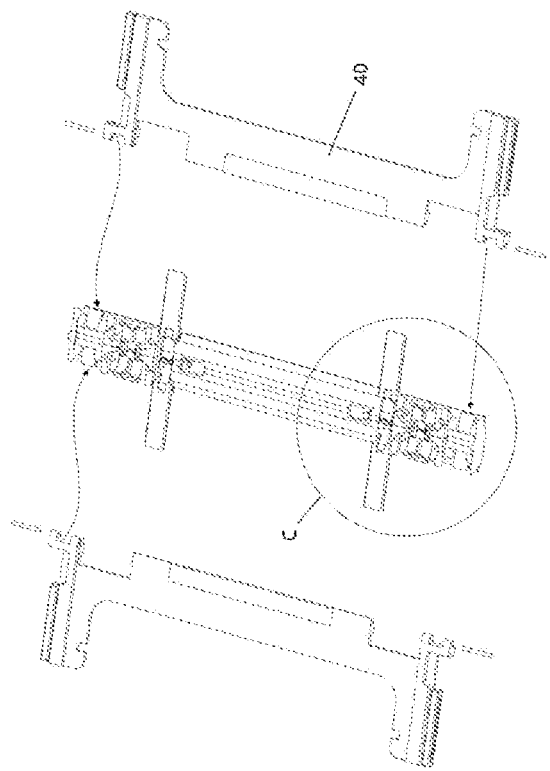
[FIG 7]
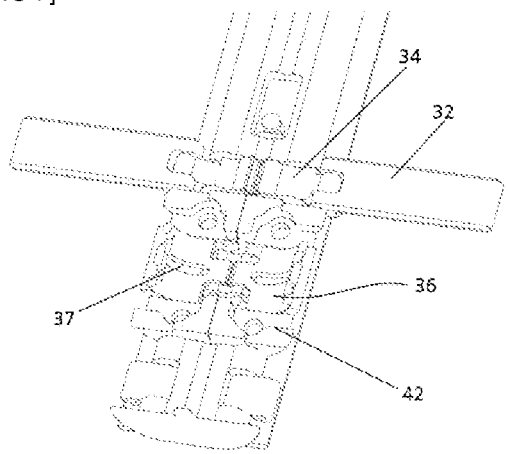

[FIG 8]
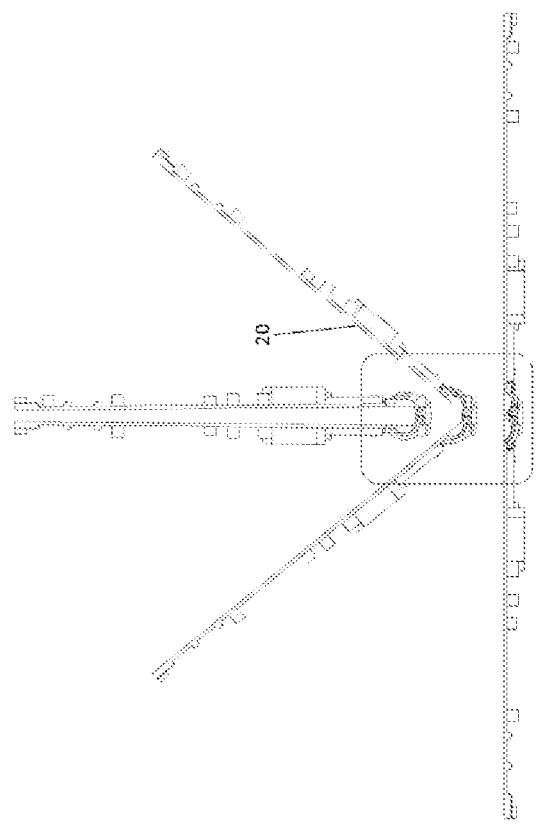

[FIG 9]
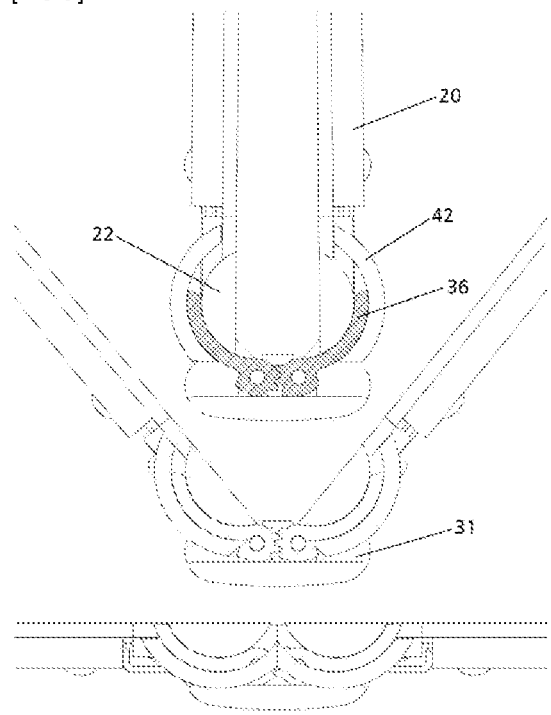
[FIG 10]
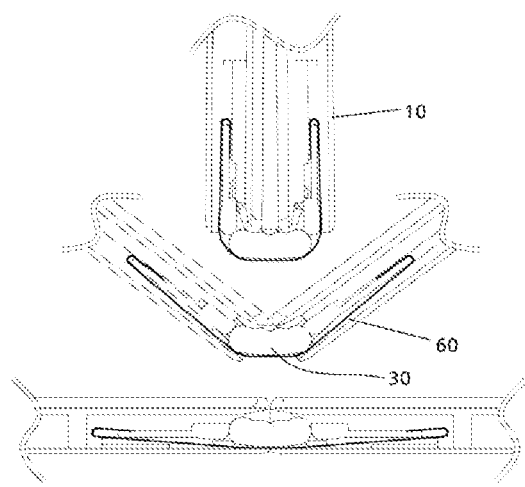

[FIG 11]
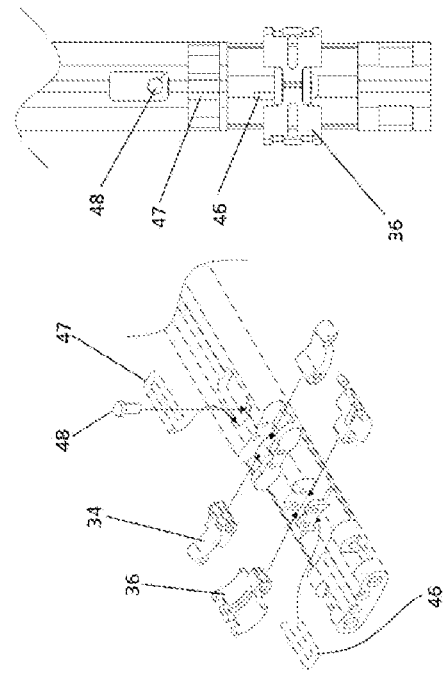
[FIG 12]
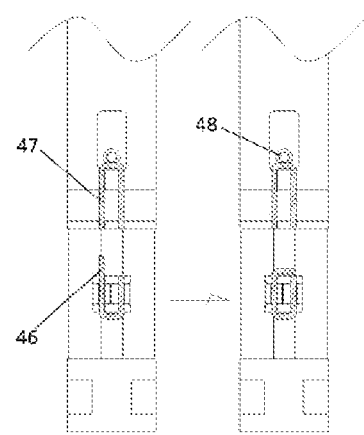

[FIG 13]
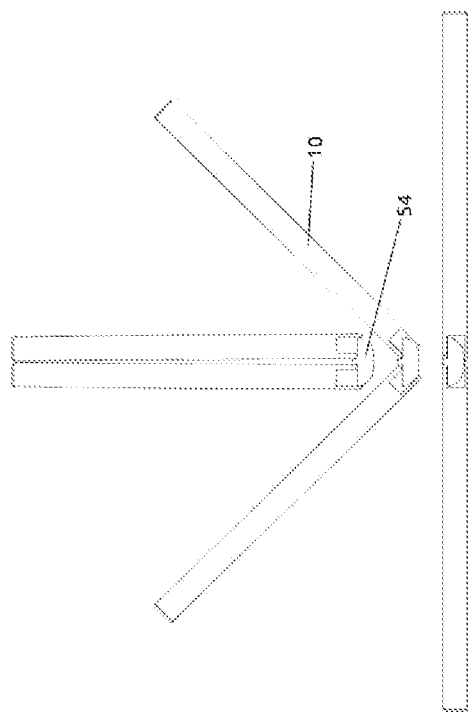
[FIG 14]
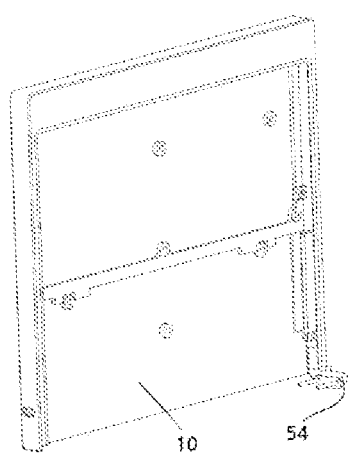

[FIG 15]
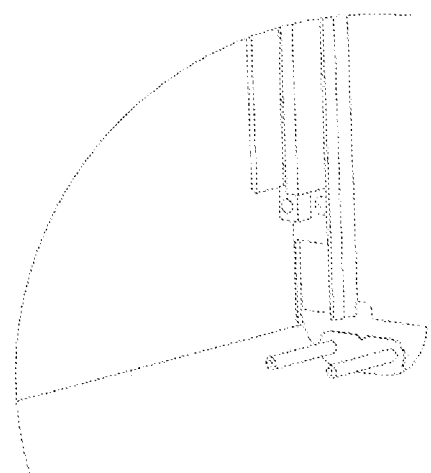
[FIG 16]
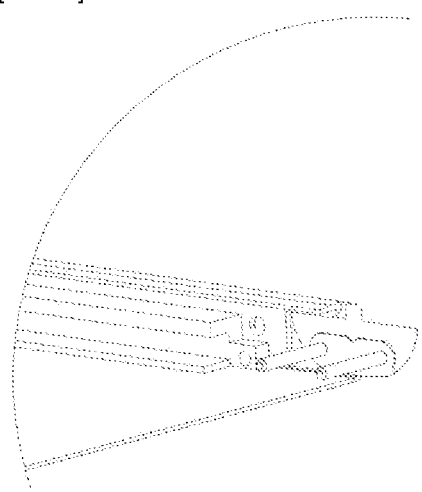

IN-FOLDING TYPE HINGE STRUCTURE HAVING FLEXIBLE DISPLAY PANEL INSTALLED THEREIN

TECHNICAL FIELD

The invention relates to an in-folding type hinge structure having a flexible display panel installed therein and, more particularly, to an in-folding type hinge structure having a flexible display panel installed therein in a mobile communication terminal in which a flexible display panel is provided in a pair of panel portions which are foldably connected to each other, in which rotation supports are provided in a pair of panel portions and a folding portion that connects the pair of panel portions such that the rotation supports are located between an inside close contact portion and an outside close contact portion which are fixed to the bottom surfaces of the panel portions, and the rotation supports are configured to perform a stable folding operation of the folding portion while the two panel portions are being folded or unfolded and to support the panel portions such that the two panel portions do not rotate over 180 degrees when the two panel portions are fully unfolded, whereby damage of the flexible display panel provided on the surfaces of the two panel portions can be prevented.

BACKGROUND ART

Mobile communication terminals are configured to perform various functions. Examples of the functions include a data and speech communication function, a function of capturing a still image or a moving image using a camera, a speech storing function, a function of reproducing a music file using a speaker system, and a function of displaying a still image or a moving image (a video).

Some mobile communication terminals have additional functions for playing games, and some mobile communication terminals are embodied as multimedia devices. Recent mobile communication terminals can also receive broadcast or multicast signals and reproduce a video or a television program.

Researches for supporting and improving other functions of mobile communication terminals in addition to the above-mentioned functions have been carried out. These researches include modification and improvement of structural constituents of the mobile communication terminals and addition and improvement of software or hardware.

In general, a display module of a mobile communication terminal displays information which is processed by the mobile communication terminal. For example, when the mobile communication terminal is in a call mode, the display module displays a user interface (UI) or a graphic user interface (GUI) associated with a call.

When the mobile communication terminal is in a video call mode or an image capturing mode, the display module displays a captured or/and received image, a UI, or a GUI. The display module includes a liquid crystal display (LCD), a thin-film transistor liquid crystal display (TFT LCD), an organic light emitting diode (OLED), a flexible display, or a 3D display.

A flexible display (or a flexible LCD) has been regularly researched with its merit of deformability. It takes much time to use a rolled display like a paper roll as shown in science-fiction movie.

Therefore, transitional forms of flexible displays will be many used until the flexible displays are regularly used with sufficient development thereof, and these transitional forms will be similar to current structures of communication terminals. Accordingly, there is necessity for description of usage and protection of flexible displays when such flexible displays are used in mobile communication terminals.

An example of a hinge structure for a mobile communication terminal having a flexible display panel installed therein is disclosed in Korean Patent Application Laid-open No. 10-2015-0096827 (Title of the Invention: HINGE STRUCTURE AND FOLDABLE DISPLAY DEVICE INCLUDING THE SAME).

SUMMARY OF THE INVENTION

Technical Problem

The invention provides an in-folding type hinge structure having a flexible display panel installed therein in a mobile communication terminal in which a flexible display panel is provided in a pair of panel portions which are foldably connected to each other, in which rotation supports are provided in a pair of panel portions and a folding portion that connects the pair of panel portions such that the rotation supports are located between an inside close contact portion and an outside close contact portion which are fixed to the bottom surfaces of the panel portions, and the rotation supports are configured to perform a stable folding operation of the folding portion while the two panel portions are being folded or unfolded and to support the panel portions such that the two panel portions do not rotate over 180 degrees when the two panel portions are fully unfolded, whereby damage of the flexible display panel provided on the surfaces of the two panel portions can be prevented.

Solution to Problem

In order to achieve the above-mentioned objective, there is provided an in-folding type hinge structure having a flexible display panel installed therein, including: a folding portion (30) of which a central part is folded; and a pair of panel portions (20) that are provided on both sides of the folding portion (30).

The in-folding type hinge structure further includes: a pair of body portions (10) that accommodate the panel portions (20), respectively; and a folding portion cover (60) that covers the folding portion (30), wherein a sliding guide portion (62) is provided on an inner side surface of each body portion (10) and the sliding guide portion (62) guides a sliding wing portion (40) to move with the sliding wing portion inserted into the sliding guide portion.

The folding portion cover (60) is formed of an elastic metal and provides an elastic force when the pair of body portions (10) is folded or unfolded.

Supports (34) that are provided at two positions of a folding body (31) of the folding portion (30) and sliding plates (32) that are rotatably provided in the supports (34) may be provided in the folding portion (30).

Rotation supports (36) may be rotatably provided in the folding body (31) and an outside close contact portion (42) may be provided in the folding body (31) to be in contact with the corresponding rotation shaft (36).

The two rotation supports (36) may be coupled to the folding body (31) by a metallic shaft (46) of a ⊂-shape with one side longer, and the two supports (34) may be coupled to the folding body (31) by a metallic shaft (47) of a ⊂-shape with both sides of the same length.

End cover portions (54) may be inserted into both end faces of the folding body (31), and the end cover portions

(54) may guide the body portions (10) with respect to the folding portion (30) when the body portions (10) are folded or unfolded, and prevent the body portions (10) from rotating over 180 degrees when the body portions are fully unfolded.

The metallic shafts (46, 47) may be formed in a ⊂-shape, one metallic shaft (46) may have a ⊂-shape with one side longer and a longer protruding part of the one metallic shaft is bent in a state in which the two rotation supports (36) are connected to the folding body (31) using the one metallic shaft (46) of a ⊂-shape, and the other metallic shaft (47) may be configured such that a fixation pin (48) prevents the other metallic shaft (47) from being detached after the two supports (34) have been connected to the folding body (31).

Advantageous Effects of Invention

According to the invention, it is possible to provide an in-folding type hinge structure having a flexible display panel installed therein in a mobile communication terminal in which a flexible display panel is provided in a pair of panel portions which are foldably connected to each other, in which rotation supports are provided in a pair of panel portions and a folding portion that connects the pair of panel portions such that the rotation supports are located between an inside close contact portion and an outside close contact portion which are fixed to the bottom surfaces of the panel portions, and the rotation supports are configured to perform a stable folding operation of the folding portion while the two panel portions are being folded or unfolded and to support the panel portions such that the two panel portions do not rotate over 180 degrees when the two panel portions are fully unfolded, whereby damage of the flexible display panel provided on the surfaces of the two panel portions can be prevented.

According to the invention, the folding portion cover is formed of an elastic metal which is used to manufacture a leaf spring. Accordingly, the folding portion cover provides an elastic force to the body portions when the two body portions are folded or unfolded.

Since the metallic shafts that connect the rotation supports and the supports to the folding body is formed in a c-shape, it is possible to prevent the metal shafts from being released from an inserted state.

BRIEF DESCRIPTION OF THE DRAWINGS

FIG. 1 is an exploded perspective view of an in-folding type hinge structure having a flexible display panel installed therein according to the invention.

FIG. 2 is a perspective view illustrating a state in which panel portions and a folding portion are exploded in the in-folding type hinge structure having a flexible display panel installed therein according to the invention.

FIG. 3 is an enlarged perspective view of Part A in FIG. 2.

FIG. 4 is an exploded perspective view of the folding portion in the in-folding type hinge structure having a flexible display panel installed therein according to the invention.

FIG. 5 is an enlarged perspective view of Part B in FIG. 4.

FIG. 6 is a perspective view illustrating a state in which sliding wing portions are attached to both sides of the assembled folding portion in the in-folding type hinge structure having a flexible display panel installed therein according to the invention.

FIG. 7 is an enlarged perspective view of Part C in FIG. 6.

FIG. 8 is a lateral sectional view illustrating a state in which two panel portions are folded and unfolded with respect to the folding portion in the in-folding type hinge structure having a flexible display panel installed therein according to the invention when seen laterally.

FIG. 9 is a lateral sectional view illustrating an enlargement of the folding portion in FIG. 8.

FIG. 10 is a lateral sectional view illustrating movement of a folding portion cover while the panel portions are being folded or unfolded in the in-folding type hinge structure having a flexible display panel installed therein according to the invention.

FIG. 11 illustrates a perspective view and a plan view illustrating a state in which rotation supports and supports are connected to a folding body portion using shafts of a ⊂-shape in the in-folding type hinge structure having a flexible display panel installed therein according to the invention.

FIG. 12 is an inner plan view illustrating a state in which the rotation supports and the supports are connected to the folding body portion using shafts of a ⊂-shape in FIG. 11.

FIG. 13 is a lateral view illustrating a state in which an end cover portion serves as a guide and a stopper while two body portions are moving in the in-folding type hinge structure having a flexible display panel installed therein according to the invention.

FIG. 14 is a partial perspective view illustrating the end cover portion in a state in which the body portions are folded according to the invention.

FIG. 15 is an enlarged perspective view of a part of the end cover portion in FIG. 14.

FIG. 16 is a partial perspective view illustrating the end cover portion in a state in which the body portions are unfolded according to the invention.

REFERENCE SIGNS LIST

10: Body portion, 20: Panel portion, 22: Inside close contact surface
24: Guide rod, 31: Folding body, 32: Sliding plate
34: Support, 36: Rotation support, 37: Groove
46, 47: Fixation shaft, 42: Outside close contact portion
60: Folding portion cover, 62: Sliding guide portion

DESCRIPTION OF EMBODIMENTS

FIG. 1 is an exploded perspective view of an in-folding type hinge structure having a flexible display panel installed therein according to the invention.

Referring to FIG. 1, an in-folding type hinge structure having a flexible display panel installed therein according to the invention includes a folding portion 30 of which a central part is folded, a pair of panel portions 20 that are provided on both sides of the folding portion 30, body portions 10 that accommodate the respective panel portions 20, and a folding portion cover 60 that covers the folding portion 30.

A sliding guide portion 62 is provided on an inner side surface of each body portion 10 according to the invention. The sliding guide portion 62 serves to guide movement of a sliding wing portion 40 which is inserted thereinto in FIG. 2.

According to the invention, a folding portion cover 60 is formed of an elastic material, for example, a metal which is used to manufacture a leaf spring, and can be used as a leaf spring for providing an elastic force when the body portions 10 are folded or unfolded in the invention.

FIG. 2 is a perspective view illustrating a state in which panel portions and a folding portion are exploded in the in-folding type hinge structure having a flexible display panel installed therein according to the invention. FIG. 3 is an enlarged perspective view of Part A in FIG. 2.

Referring to FIGS. 2 and 3, sliding wing portions 40 that can rotate about the folding portion 30 is provided on both sides of the folding portion 30 in the invention.

A guide portion 28 that guides movement of a sliding plate 32 illustrated in FIG. 4 which is inserted thereinto is provided on the rear surface of each panel portion 20 according to the invention.

According to the invention, a rounded inside close contact portion 22 is provided at each corner at which each panel portion 20 is coupled to the folding portion 30, and a protruding guide rod 24 is provided on the inside close contact portion 22.

In the invention, the guide rod 24 is inserted into a groove 37 of a rotation support 36 illustrated in FIG. 4 and moves along the groove 37.

According to the invention, a fixation groove 26 which is formed at a corner of each panel portion 20 is fixed to a groove 44 of an outside close contact portion 42 in FIG. 4 via the fixation groove 26 using a screw or the like in a state in which the corners of the two panel portions 20 are coupled to the folding portion 30.

FIG. 4 is an exploded perspective view of the folding portion in the in-folding type hinge structure having a flexible display panel installed therein according to the invention. FIG. 5 is an enlarged perspective view of Part B in FIG. 4.

Referring to FIGS. 4 and 5, a support 34 that is rotatable about a folding body 31 and a sliding plate 32 that is rotatable about the support 34 are provided at two positions of the folding body 31 in the folding portion 30 according to the invention.

A rotation support 36 that is rotatable about the folding body 31 is provided in the invention, and the outside close contact portion 42 is placed on the folding body 31 such that it is in contact with the rotation support 36.

The rotation support 36 in the invention is coupled to the folding body 31 using a metallic shaft 46 of a ⊂-shape with one side longer, and a pair of supports 34 is coupled to the folding body 31 using a metallic shaft 47 of a ⊂-shape with both sides of the same length. The metallic shaft 47 is prevented from being detached from the folding body 31 by a fixation pin 48.

An end cover portion 54 is inserted into both end faces of the folding body 31 according to the invention. The end cover portions 54 in the invention allow the body portions 10 to be guided with respect to the folding portion 30 when the body portions 10 are folded or unfolded, and also serves as a stopper that prevents the body portions 10 from rotating over 180 degrees in a state in which the body portions are fully unfolded.

Gear teeth are formed on the surfaces on which the supports 34 engage with each other, and thus the gear teeth engage with each other.

FIG. 6 is a perspective view illustrating a state in which the sliding wing portions are attached to both sides of the assembled folding portion in the in-folding type hinge structure having a flexible display panel installed therein according to the invention. FIG. 7 is an enlarged perspective view of Part C in FIG. 6.

Referring to FIGS. 6 and 7, when assembling of the folding portion 30 has been completed, the sliding wing portions 40 are attached to both sides of the folding portion 30 such that they can rotate about the folding portion 30.

The outside close contact portion 42 in the invention is coupled to the inside close contact portion 22 of each panel portion 20 using a screw or the like in a state in which the outside close contact portion 42 is placed on the rotation support 36 and is in close contact with the inside close contact portion 22.

FIG. 8 is a lateral sectional view illustrating a state in which two panel portions are folded and unfolded with respect to the folding portion in the in-folding type hinge structure having a flexible display panel installed therein according to the invention when seen laterally. FIG. 9 is a lateral sectional view illustrating an enlargement of the folding portion in FIG. 8.

Referring to FIGS. 8 and 9, the inside close contact portions 22 of each panel portion 20 and the outside close contact portions 42 are provided in a state in which the rotation supports 36 which are rotatably connected to the folding body 31 are interposed therebetween.

According to the invention, gear teeth are formed on a part in which a pair of rotation supports 36 is connected to be in contact with each other such that the pair of panel portions 20 are simultaneously opened or closed.

When the inside close contact portion 22 of each panel portion 20 and the outside close contact portion 42 are in tight contact with the rotation support 36, the two panel portions 20 maintain an open angle therebetween in a state in which a user applies a force to open the two panel portions 20 at the open angle.

With this configuration, a user can watch a TV program, the movie, or the like using a foldable smartphone which is a completed product while one body portion 10 is placed on a desk and the other body portion 10 is kept folded at a predetermined angle.

The two panel portions 20 and the rotation supports 36 provided in the folding portion connecting the two panel portions are located between a pair of the inside close contact portion 22 and the outside close contact portion 42 which are fixed to the bottom surfaces of the panel portions 20, and the rotation supports are configured to perform a stable folding operation of the folding portion 30 while the two panel portions 20 are being folded or unfolded and to support the panel portions 20 such that the two panel portions do not rotate over 180 degrees when the two panel portions 20 are fully unfolded, whereby damage of the flexible display panel provided on the surfaces of the body portions can be prevented.

FIG. 10 is a lateral sectional view illustrating movement of the folding portion cover while the panel portions are being folded or unfolded in the in-folding type hinge structure having a flexible display panel installed therein according to the invention.

Referring to FIG. 10, the folding portion cover 60 formed of a material which is used to manufacture a leaf spring is provided in the two body portions 10 while surrounding the folding portion 30.

The folding portion cover 60 formed of a material which is used to manufacture a leaf spring serves as a leaf spring such that an elastic force is provided while the two body portions 10 are being folding or unfolded.

FIG. 11 illustrates a perspective view and a plan view illustrating a state in which the rotation supports and the supports are connected to the folding body portion using the shafts of a ⊂-shape in the in-folding type hinge structure having a flexible display panel installed therein according to the invention. FIG. 12 is an inner plan view illustrating a state in which the rotation supports and the supports are connected to the folding body portion using the shafts of a ⊂-shape in FIG. 11.

Referring to FIGS. 11 and 12, the rotation supports 36 and the supports 34 are rotatably connected to the folding body 31 using the shafts 46 and 47 formed of a metallic material.

The metallic shafts 46 and 47 in the invention are formed in a ⊂-shape. If a metallic shaft of a linear shape is inserted into the rotation supports 36 and the supports 34, the rotation supports 36 and the supports 34 may be detached from the folding body 31 while rotating.

When the metallic shafts connecting the rotation supports 36 and the supports 34 to the folding body 31 are detached, a defective product may be obtained or failure may occur. Accordingly, it is very important that the metallic shafts are not detached in a state in which the rotation supports 36 and the supports 34 are connected to the folding body 31.

In the invention, one metallic shaft 46 is formed in a ⊂-shape with one side longer. In a state in which a pair of rotation supports 36 are connected to the folding body 31 using the metallic shaft 46 of a ⊂-shape, the longer protruding part is bent.

After the other metallic shaft 47 has connected a pair of supports 34 to the folding body 31, the fixation pin 48 prevents the metallic shaft 47 from being detached.

FIG. 13 is a lateral view illustrating a state in which the end cover portion serves as a guide and a stopper while two body portions are moving in the in-folding type hinge structure having a flexible display panel installed therein according to the invention. FIG. 14 is a partial perspective view illustrating the end cover portion in a state in which the body portions are folded according to the invention. FIG. 15 is an enlarged perspective view of a part of the end cover portion in FIG. 14.

Referring to FIGS. 13 to 15, the end cover portion 54 is provided in the body portion and serves as a stopper that prevents the body portions 10 from being further folded over 180 degrees in the direction opposite to the folding direction when the body portions 10 have been fully unfolded.

FIG. 16 is a partial perspective view illustrating the end cover portion in a state in which the body portions are unfolded according to the invention.

Referring to FIG. 16, the end cover portion 54 is hooked to the inside surfaces of the body portions 10 and serves as a stopper that prevents the body portions 10 from being further folded over 180 degrees in the direction opposite to the folding direction when the body portions 10 have been fully unfolded.

INDUSTRIAL APPLICABILITY

While an exemplary embodiment of the invention has been described above using specific terms, such description is only for explanation and it is obvious that the embodiment can be modified in various forms without departing from the technical spirit and scope of the appended claims. Such modified embodiments should not be understood separately from the spirit and scope of the invention and should belong to the appended claims.

The invention claimed is:

1. An in-folding type hinge structure having a flexible display panel installed therein, comprising:
   a folding portion (30) of which a central part is folded;
   a pair of panel portions (20) that are provided on both sides of the folding portion (30);
   a pair of body portions (10) that accommodate the panel portions (20), respectively; and
   a folding portion cover (60) that covers the folding portion (30),
   wherein a sliding guide portion (62) is provided on an inner side surface of each body portion (10) and the sliding guide portion (62) guides a sliding wing portion (40) to move with the sliding wing portion inserted into the sliding guide portion, and
   wherein the folding portion cover (60) is formed of an elastic metal and provides an elastic force when the pair of body portions (10) is folded or unfolded.

2. The in-folding type hinge structure having a flexible display panel installed therein according to claim 1, wherein supports (34) that are provided at two positions of a folding body (31) of the folding portion (30) and sliding plates (32) that are rotatably provided in the supports (34) are provided in the folding portion (30),
   wherein rotation supports (36) are rotatably provided in the folding body (31) and an outside close contact portion (42) is provided in the folding body (31) to be in contact with the corresponding rotation shaft (36), and
   wherein the two rotation supports (36) are coupled to the folding body (31) by a metallic shaft (46) of a ⊂-shape with one side longer, and the two supports (34) are coupled to the folding body (31) by a metallic shaft (47) of a ⊂-shape with both sides of the same length.

3. The in-folding type hinge structure having a flexible display panel installed therein according to claim 1, wherein end cover portions (54) are inserted into both end faces of the folding body (31), and
   wherein the end cover portions (54) guide the body portions (10) with respect to the folding portion (30) when the body portions (10) are folded or unfolded, and prevent the body portions (10) from rotating over 180 degrees when the body portions are fully unfolded.

4. The in-folding type hinge structure having a flexible display panel installed therein according to claim 1, wherein the metallic shafts (46, 47) are formed in a ⊂-shape,
   wherein one metallic shaft (46) has a ⊂-shape with one side longer and a longer protruding part of the one metallic shaft is bent in a state in which the two rotation supports (36) are connected to the folding body (31) using the one metallic shaft (46) of a ⊂-shape, and
   wherein the other metallic shaft (47) is configured such that a fixation pin (48) prevents the other metallic shaft (47) from being detached after the two supports (34) have been connected to the folding body (31).

* * * * *